US010209347B2

(12) United States Patent
Chanda et al.

(10) Patent No.: US 10,209,347 B2
(45) Date of Patent: Feb. 19, 2019

(54) RADAR TEST SYSTEMS AND METHODS

(71) Applicant: FEV NORTH AMERICA, INC., Auburn Hills, MI (US)

(72) Inventors: Soumendu Chanda, Auburn Hills, MI (US); Martin Pischinger, München (DE)

(73) Assignee: FEV NORTH AMERICA, INC., Auburn Hills, MI (US)

( * ) Notice: Subject to any disclaimer, the term of this patent is extended or adjusted under 35 U.S.C. 154(b) by 439 days.

(21) Appl. No.: 15/040,017

(22) Filed: Feb. 10, 2016

(65) Prior Publication Data

US 2017/0227627 A1 Aug. 10, 2017

(51) Int. Cl.
*G01S 7/40* (2006.01)

(52) U.S. Cl.
CPC .......... *G01S 7/4052* (2013.01); *G01S 7/4021* (2013.01); *G01S 2007/4082* (2013.01)

(58) Field of Classification Search
CPC .......... G01S 7/4052; G01S 2007/4095; G01S 2007/4082; G01S 7/4004; G01S 2013/9064; G01S 7/497; G01S 7/4972; G01S 7/4802; G01S 7/4021; G09B 9/54; G09B 9/40
USPC .......................... 342/169, 170, 171, 172, 173
See application file for complete search history.

(56) References Cited

U.S. PATENT DOCUMENTS

| 5,721,553 | A * | 2/1998 | James | G01S 7/4052 342/165 |
|---|---|---|---|---|
| 6,087,995 | A | 7/2000 | Grace et al. | |
| 6,252,541 | B1 * | 6/2001 | James | G01S 7/4052 342/1 |
| 6,335,705 | B1 | 1/2002 | Grace et al. | |
| 2009/0046002 | A1 * | 2/2009 | Tsunoda | G01S 7/4004 342/167 |
| 2010/0066591 | A1 * | 3/2010 | Kolmhofer | G01S 7/4026 342/173 |
| 2013/0002474 | A1 * | 1/2013 | Shipley | G01S 7/4052 342/171 |
| 2014/0070981 | A1 * | 3/2014 | Kim | G01S 7/4052 342/171 |
| 2015/0035697 | A1 * | 2/2015 | Cho | G01S 7/4026 342/172 |

FOREIGN PATENT DOCUMENTS

| EP | 1034442 | 2/2009 |
|---|---|---|
| WO | 99/21029 | 4/1999 |

OTHER PUBLICATIONS

"Test Systems for Automotive Radar" Vehicular Technology Conference Proceeding, 2000. VTC 2000—Spring Tokyo. 2000 IEEE 51st, pp. 492-495 vol. 1.
Zeng et al., Performance Evaluation of Automotive Radars Using Carrier-Phase Differential GPS, Jun. 15, 2009.

* cited by examiner

*Primary Examiner* — Olumide Ajibade Akonai
(74) *Attorney, Agent, or Firm* — Dinsmore & Shohl LLP

(57) ABSTRACT

Radar testing systems with radar system rotational systems and methods for using the radar testing systems are disclosed. A radar testing system includes a radar system to be tested, a computer, and a radar simulator. A radar sensor rotation system mechanically coupled to a radar sensor of the radar system is communicatively coupled to the computer and configured to rotate the radar sensor to predefined and desired angles for predetermined amounts of time during testing of the radar system.

14 Claims, 6 Drawing Sheets

RADAR TEST SYSTEMS AND METHODS

FIELD OF TECHNOLOGY

The present disclosure relates to radar test systems and methods, and in particular to radar test systems and methods with a rotating radar sensor.

BACKGROUND

The development and use of vehicle radar systems for adaptive cruise control, headway alert, collision avoidance, and mitigation and brake support are known. Validation of such radar systems must be performed and requires a considerable amount of effort, time, and cost. One technique in the validation of radar systems is the use of simulated virtual objects provided by radar testing systems. However, current radar testing systems do not allow for automatic variation of the angle between a simulated moving virtual object and a radar sensor for a radar system being tested. Accordingly, there is a need for improved radar testing systems that provide an automatic variation in angles for simulated virtual moving objects within a field of view for a radar system being tested.

SUMMARY

In one aspect, a radar testing system includes a radar system to be tested, the radar system having a radar sensor configured to transmit an outgoing radar signal and receive a return radar signal. A radar simulator is included and has a radar simulator antenna configured to receive the outgoing radar signal from the radar sensor and transmit a simulated return radar signal back to the radar sensor. A computer communicatively coupled to the radar simulator is configured to provide parameters related a simulated virtual object in the radar sensor FOC to the radar simulator. The computer is also communicatively coupled to a radar sensor rotation system configured to rotate the radar sensor about an axis of rotation to a plurality of predetermined angles during a test of the radar system.

In another aspect, a radar testing system includes a radar system with an amplifier, a mixer, a phase-locked loop, a voltage controlled oscillator, and a radar sensor. The radar sensor is configured to transmit an outgoing radar signal and receive a return radar signal. The radar testing system includes a radar simulator that has a radar simulator antenna and a simulation processor. The radar simulator antenna is configured to receive the outgoing radar signal from the radar sensor and transmits a simulated return radar signal representative of a virtual object within the FOV of the radar sensor back to the radar sensor. A computer is communicatively coupled to the radar simulator and includes one or more processors and a non-transitory computer-readable medium storing computer-executable instructions. The computer is configured to receive parameters for a virtual object in a FOV of the radar sensor and provide the parameters related to the virtual object to the radar simulator. A radar sensor rotation system is communicatively coupled to the computer and has a rotation shaft that is mechanically coupled to a motor. The rotation shaft is mechanically coupled to the radar sensor. The motor is configured to receive instructions from the computer to rotate the rotation shaft such that the radar sensor is positioned at one or more angles relative to the radar simulator antenna during testing of the radar system. The computer executable instructions executed by the one or more processors can transmit instructions to the radar sensor rotation system to rotate and position the rotation shaft, and the radar sensor mechanically attached thereto, at a first angle relative to the radar simulator for a first preset amount of time. During the first preset amount of time, the radar system can transmit outgoing radar signals and the radar simulator van receive the outgoing radar signals and transmit simulate return radar signals representative of the virtual object in the FOV of the radar sensor. The computer-executable instructions executed by the one or more processors can also cause the radar sensor rotation system to position the radar sensor at a second angle relative to the radar simulator for a second preset amount of time. During the second preset amount of time, the radar system can transmit outgoing radar signals and the radar simulator van receive the outgoing radar signals and transmit simulate return radar signals representative of the virtual object in the FOV of the radar sensor. In this manner, the radar testing system provides a simulated virtual object to the radar system at two different angles relative to the radar sensor, automatically.

In another aspect, a radar testing system includes a radar system with an amplifier, a mixer, a phase-locked loop, a voltage controlled oscillator, and a radar sensor. The radar sensor is configured to transmit an outgoing radar signal and receive a return radar signal. The radar testing system includes a radar simulator that has a radar simulator antenna and a simulation processor. The radar simulator antenna is configured to receive the outgoing radar signal from the radar sensor and transmits a simulated return radar signal representative of a virtual object within the FOV of the radar sensor back to the radar sensor. A computer is communicatively coupled to the radar simulator and includes one or more processors and a non-transitory computer-readable medium storing computer-executable instructions. The computer is configured to receive parameters for a virtual object in a FOV of the radar sensor and provide the parameters related to the virtual object to the radar simulator. A radar sensor rotation system is communicatively coupled to the computer and has a rotation shaft that is mechanically coupled to a motor. The rotation shaft is mechanically coupled to the radar sensor. The motor is configured to receive instructions from the computer to rotate the rotation shaft such that the radar sensor is positioned at one or more angles relative to the radar simulator antenna during testing of the radar system. The computer-executable instructions executed by the one or more processors cause the radar sensor rotation system to position the radar sensor at a plurality of angles relative to the radar simulator for a predetermined amount of time and the radar simulator to receive an outgoing radar signal from the radar system for each of the plurality of angles. The computer-executable instructions executed by the one or more processors also cause the radar simulator to transmit return radars signals representative of a simulated virtual object in the FOV of the radar sensor at each of the plurality of angles. The radar system can receive the simulated virtual object radar signals for the virtual object at each of the plurality of angles and thus be tested for detecting a simulated virtual object moving at different angles with respect to a radar sensor.

These and additional features provided by the aspects described herein will be more fully understood in view of the following detailed description, in conjunction with the drawings.

BRIEF DESCRIPTION OF THE DRAWINGS

The aspects set forth in the drawings are illustrative and exemplary in nature and not intended to limit the subject matter defined by the claims. The following detailed description of the illustrative embodiments can be understood when read in conjunction with the following drawings, where like structure is indicated with like reference numerals, and in which:

DETAILED DESCRIPTION

Figure 1A:
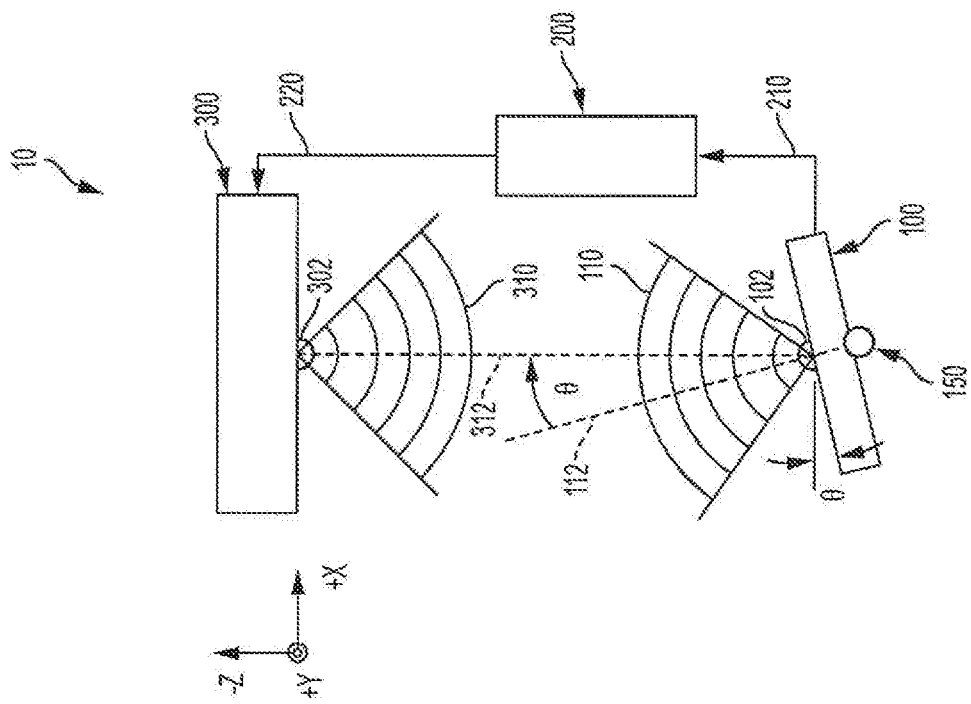
FIG. 1A schematically depicts a radar testing system according to one or more aspects shown and described herein.
Figure 1B:
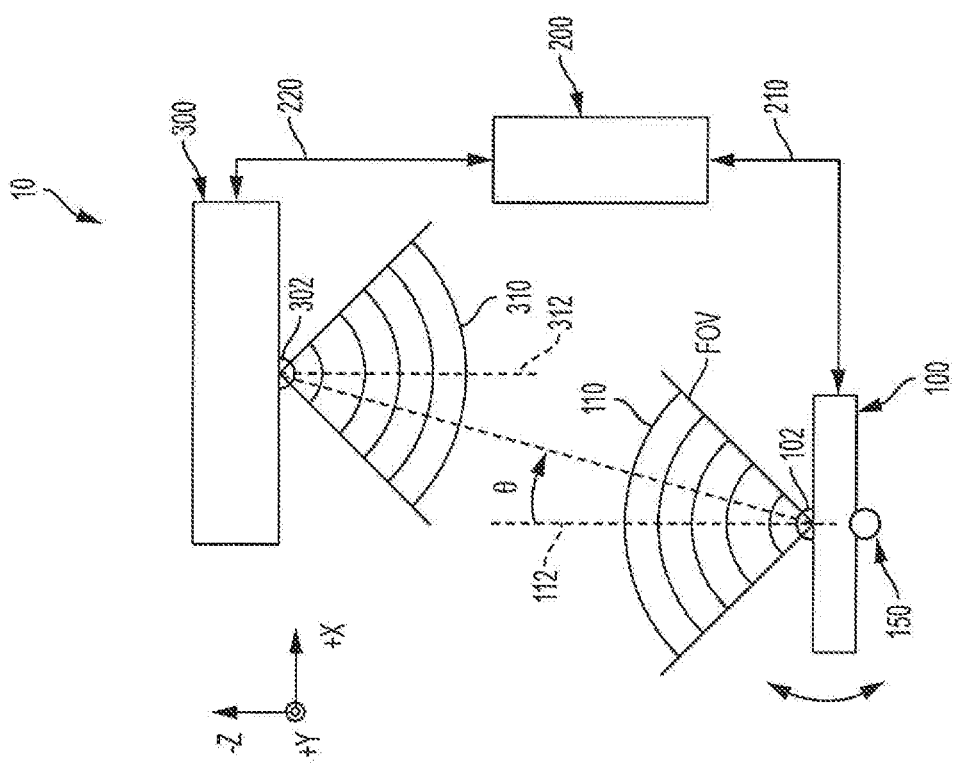
FIG. 1B schematically depicts a radar testing system according to one or more aspects shown and described herein.

Referring now to FIGS. 1A and 1B, one aspect of a radar testing system 10 includes a radar system 100, a radar sensor rotation system 150, a computer 200 and a radar simulator 300. The computer 200 is communicatively coupled with the radar sensor rotation system 150 via communication link 210 and the simulator 300 via communication link 220. The radar system has a radar sensor 102 configured to transmit an outgoing radar signal 110 about a central radar signal axis 112, and receive a simulated return radar signal 310 from the radar simulator. The radar simulator 300 is configured to provide the return radar signal 310 about a central return radar signal axis 312 to the radar system 100, the return signal 310 being representative of a simulated virtual object in the FONT of the radar sensor 102. As depicted in FIG. 1A, the radar system 102 is offset from a radar simulator antenna 302 by the angle θ shown in the figure. It should be appreciated that conventional radar testing systems do not have the capability to alter the offset angle θ without manual movement of the radar system 100 and/or the radar simulator 300. As such, testing of a conventional radar system with respect to the simulated virtual object and in the configuration shown in FIG. 1A is limited to the simulated virtual object moving towards or away the radar sensor 102 along the Z-axis shown in the figure.

With reference to FIG. 1B, the radar sensor rotation system 150 has rotated the radar sensor 102 by the angle θ relative to the X-axis. As depicted in FIG. 1B, the rotation of the radar sensor 102 has provided the offset angle θ between the central radar signal axis 112 of the radar sensor 102 and the a central return radar signal axis 312 of the radar simulator antenna 302 without displacement, i.e. non-rotational movement of either the radar system 100 or the radar simulator 300. In some instances, the computer 200 is configured to instruct the radar sensor rotation system 150 to rotate the radar sensor 102 through a plurality of predetermined angles in a continuous manner and/or for a predetermined amount of time at each predetermined angle while the radar system 100 transmits outgoing radar signals 110. It should be appreciated that rotation of the radar sensor 102 provides testing of the radar system 100 with the virtual object moving in the X-Z plane.

Figure 2:
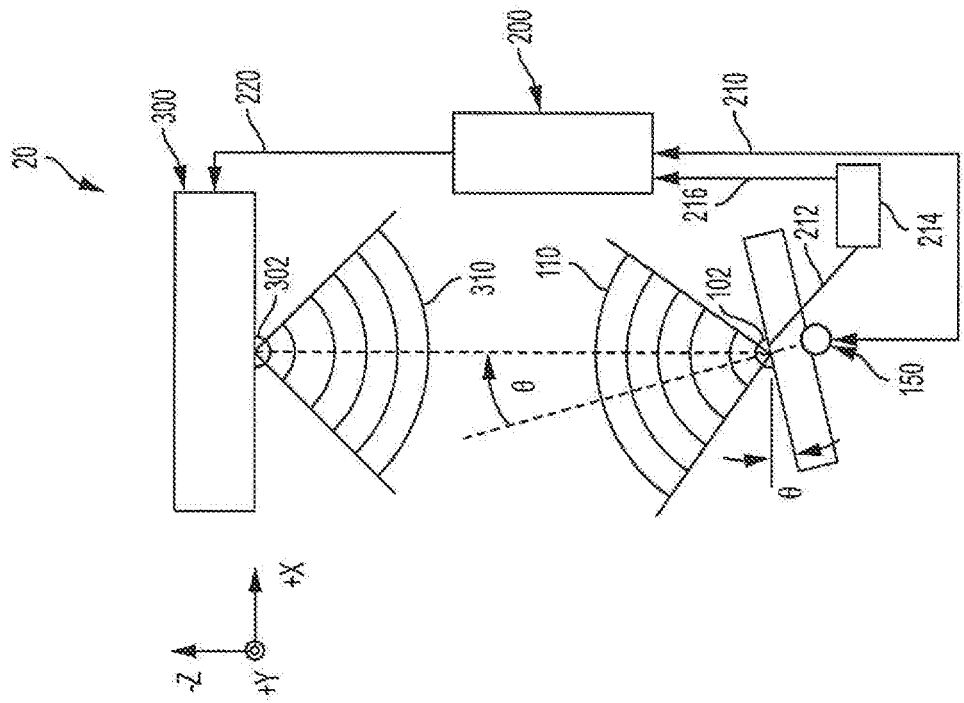
FIG. 2 schematically depicts a radar testing system according to one or more aspects shown and described herein.

With reference to FIG. 2, another aspect of a radar testing system 20 includes the radar system 100, the radar sensor rotation system 150, the computer 200 and the radar simulator 300. The computer 200 is communicatively coupled with the radar sensor rotation system 150 via the bi-directional communication link 210 and the radar sensor 102 is communicatively coupled with the computer 200 via a separate communication link 212. The communication links 210 and 212 allow independent testing/monitoring and control of the radar sensor rotation system 150 and radar sensor 102.

Figure 3:
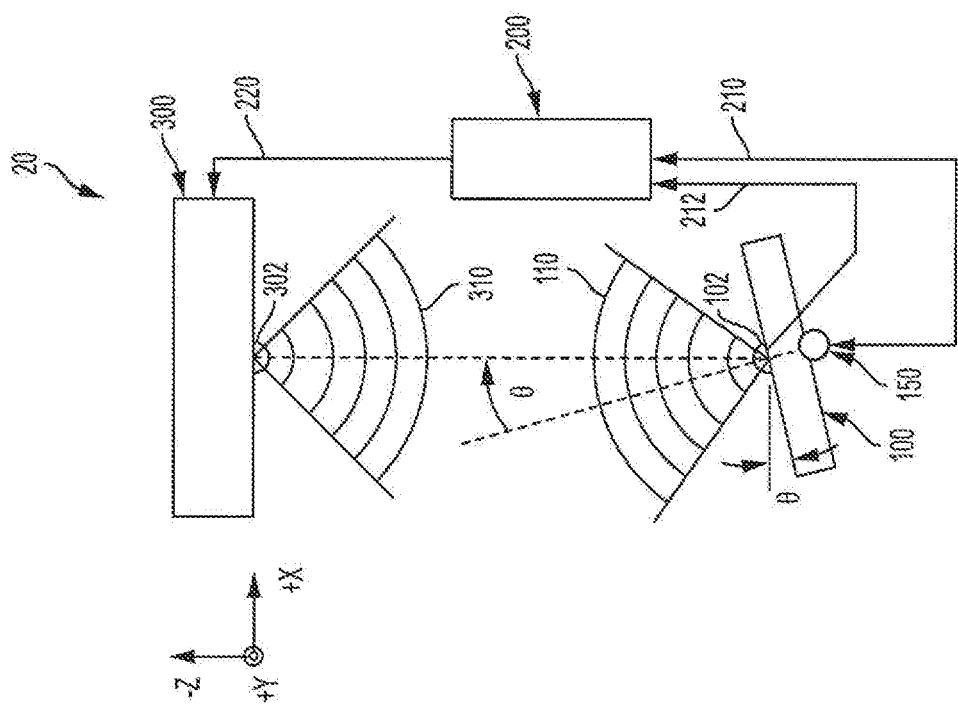
FIG. 3 schematically depicts a radar testing system according to one or more aspects shown and described herein.

With reference to FIG. 3, another aspect of a radar testing system 30 includes the radar system 100, the radar sensor rotation system 150, the computer 200 and the radar simulator 300. The computer 200 is communicatively coupled with the radar sensor rotation system 150 via the bi-directional communication link 210 and the radar sensor 102 is communicatively coupled to an Advanced Driver Assistance System (ADAS) controller 214 via the separate communication link 212. The ADAS controller 214 is communicatively coupled to the computer via a communication link 216. The communication links 210, 212 and 216 allow independent testing/monitoring and control of the radar sensor rotation system 150 and radar sensor 102. In addition, the communication links 212, 216 and ADAS controller 214 allow for verification and validation of the software algorithms in the ADAS controller 214.

Figure 4:
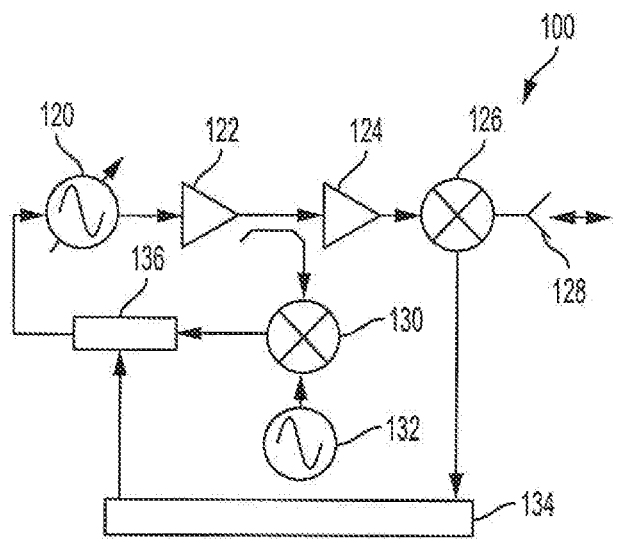
FIG. 4 schematically depicts a radar system according to one or more aspects shown and described herein.

The radar test system disclosed herein can be used to test any radar system used in vehicle radar applications. Such radar systems can include automotive radar bands of 24 GHz and/or 77 GHz. The radar systems can have long range radar capabilities with a narrow band operation that covers distances up to 250 meters (m) (820.2 feet), vehicle speeds up to 250 kilometers per hour (km/h) (155.3 miles/hour) and spatial resolution of about 0.5 m (about 1.64 feet). The radar systems can also have short/mid-range capabilities with a wide band operation that covers distances up to 30 m (98.43 feet), vehicle speeds up to 150 km/h (93.21 miles/h) and monitors the immediate surroundings of a vehicle. With reference to FIG. 4, one aspect of the radar system 100 includes a voltage controlled oscillator (VCO) 120 and one or more amplifiers 122, 124. A transceiver mixer 126 and a radar antenna 128 are communicatively coupled and receive signals from the voltage controlled oscillator 120 and the one or more amplifiers 122, 124. The radar system 100 also includes a harmonic mixer 130, a low-noise reference oscillator 132, a DSP controller 134, and a PLL 136.

Output from the VCO 120 is amplified by one of more amplifiers 122, 124. It should be appreciated that the VCO 120 is the basic energy source for generation of the outgoing radar signal 110 for the radar system 100. The radar system 100 also includes a low-noise reference oscillator 132 that generates a stable reference signal. The reference signal from the reference oscillator 132 may be fed to a harmonic mixer 130. A signal proportional to the amplifier 122 output may also be fed to the harmonic mixer 130, which in turn compares the amplifier 122 output to the stable reference signal and generates an offset/error signal. The offset/error signal is fed to the Phase Locked Loop (PLL) 136 circuit, the 136 circuit acting as a feedback control system that controls the output of the VCO 120. Output of the amplifier 124 may be fed to a transceiver mixer 126 and output from the transceiver mixer 126 is provided to the radar antenna 128. The radar antenna 128 acts as the interface between the radar system 100 and free space through which radio waves are transmitted and received. The radar antenna 128 may transduce free space propagation to guided wave propagation during reception and the opposite during transmission. The signals received by the radar antenna 128 are fed to the transceiver mixer 126 which communicates the information from the signals to a digital sensor processing controller (DSP) 134. The DSP 134 may also be connected with the PLL 136 it should be appreciated that the radar sensor 102 can be equivalent to the radar antenna 128, or in the alternative, the radar sensor 102 can be equivalent to the some or all of components and circuit depicted in FIG. 4.

Figure 5:
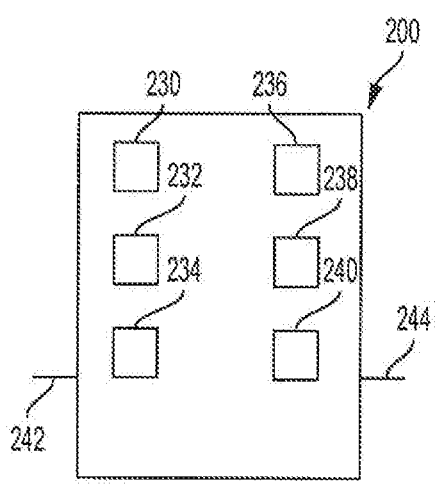
FIG. 5 schematically depicts a computer according to one or more aspects shown and described herein.

Referring now to FIG. 5, the computer 200 includes one or more processors 230, one or more memory modules 232, a monitor 234, keypad 236 and one or more other components 238, 238 used in the operation of the computer 200. Each of the one or more processors 230 may be a controller, an integrated circuit, a microchip or any other computing device. The one or more memory modules 232 can be configured as RAM, ROM, flash memories, hard drives, and/or any device capable of storing computer-executable instructions such that the machine readable instructions can be accessed by the one or more processors 230. The one or more processors 230 can be coupled to a communication path (not shown) that provides signal interconnectivity between various modules of the computer 200, the radar system 100 and radar simulator 300. Accordingly, the communication path can communicatively couple any number of processors with one another, and allow modules of the computer 200, radar system 100 and radar simulator 300 to operate in a distributed computing environment. Specifically, each of the modules can operate as a node that may send and/or receive data. As used herein, the term "communicatively coupled" means that coupled components are capable of exchanging data signals with one another such as, for example, electrical signals via conductive medium, over-the-air electromagnetic signals, optical signals via optical waveguides, and the like.

The computer 200 has a first port 242 that allows communication between the computer 200 and the radar system 100 via communication link 210 and a second port 244 that allows communication between the computer 200 and the radar simulator 300 via communication link 220. The first port 242 and the second port 244 can be any port that allows for transfer of information, instructions, data, signals, etc., between the computer 200 and the radar system 100 and radar simulator 300, respectively. Such types of ports include a digital visual interface port, displayport, E-Sata port, IEEE 1394 interface port, PS/2 port, serial port, VGA port, SCSI port, USE port, etc. The communication link 220 and communication link 244 can be any communication link that for transfer of information, instructions, data, signals, etc., between the computer 200 and the radar system 100 and radar simulator 300, respectively. Such types of communication links include a digital visual interface cable, displayport cable, E-Sata cable, IEEE 1394 interface cable, PS/2 cable, serial cable, VGA cable, SCSI cable, USE cable, etc.

Figure 6:
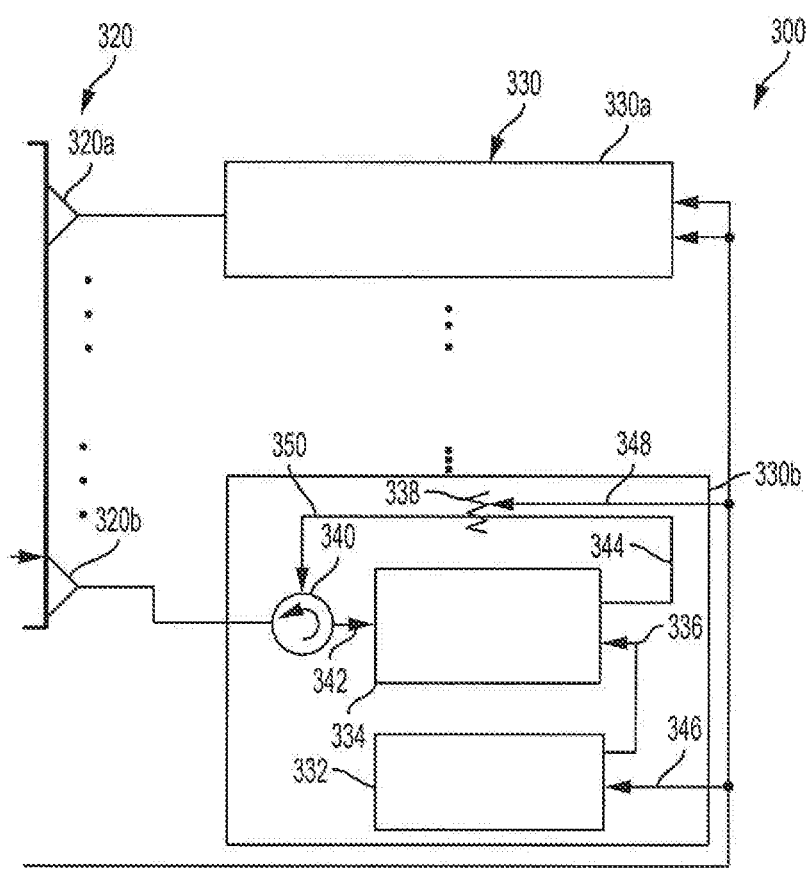
FIG. 6 schematically depicts a radar simulator according to one or more aspects shown and described herein.

The radar test system disclosed herein can use any radar simulator employed to validate radar systems, for example, the ME7220A Radar Testing System by ANRITSU out of Richardson, Tex. Such radar simulators can simulate virtual objects with a target distance of about 3.5 meters (m) (about 11.48 feet) for near target testing, about 116.5 in (about 382.2 feet) for far target testing and a distance accuracy of about +/−0.5 m (1.64 feet) for near target testing and about +/−2.0 m (6.562 feet) for far target testing. The radar cross section (RCS) is a minimum of about −4 dBsm for near target testing and a minimum of about 50 dBsm for far target testing. A typical simulated speed range for the virtual object is between 0-250 km/h (0-155.3 mile/h) with a minimum speed step size of 0.1 km/h (0.06214 mile/h) and a maximum speed error of 0.2 km/h (0.1243 mile/h). With reference now to FIG. 6, an example of the radar simulator 300 includes an antenna array 320 which receives the outgoing radar signal 110 from the radar system 100 and provides the received radar signal 110 to a transmit/receive radio frequency processor 330. The transmit/receive radio frequency processor 330 processes the radar signal 110 received from the antenna array 320 and transmits a simulated, i.e. processed, radar signal 310 back to the radar system 100 via the antenna array 320. Processing of the received outgoing radar signal 110 by the transmit/receive radio frequency processor 330 provides a simulated virtual object to the radar system 100. The radar system 100 responds to the processed signal transmitted by the radar simulator 300 by detecting the simulated virtual object within its FOV.

The test antenna array 320 of the radar simulator 300 can include a plurality of antenna elements 320a, 320b, each of which may be coupled to the transmit/receive radio frequency processor 330. It should be appreciated that only two antenna elements are depicted in FIG. 6, however any number of antenna elements can be included. Each antenna element 320a, 320b, or simply referred to as antenna, 320a, 320b, is operable to receive an outgoing radar signal 110 transmitted by the radar system 100 and to couple the received radar signal 110 to the transmit/receive radio frequency processor 330 for processing and providing a simulated return radar signal 310. The simulated return radar signal 310 is then transmitted via the respective antenna 320a, 320b, back to the radar sensor 102 and thus back to the radar system 100.

Still referring to FIG. 6, the transmit/receive radio frequency processor 330 can include a plurality of transmit/receive processor modules 330a, 330b, each one coupled to and associated with a respective antenna 320a, 320b. Transmit/receive processor module 320b can be considered as representative of a transmit/receive processor module 330a, and other transmit/receive processor modules that may be included. The transmit/receive processor module 330b can include a circulator 340 having a first port coupled to the antenna element 330b, a second port coupled to an input port of a single-sideband generator (SSBG) 334 and a third port coupled through an amplitude adjustment element 338 to an output port of the SSBG 334. The SSBG 334 receives the outgoing radar signal 110 via the antenna element 320b and circulator 340. In response to a control signal 346 fed thereto from the computer 200, frequency synthesizer 332 generates an offset signal 336 having an amplitude and frequency provided by the computer 200. The offset signal 336 is coupled to a second input port of the SSBG 334. The amplitude and frequency of offset signal 336 is selected to simulate a particular Doppler and/or range offset for the virtual object and thus to provide the simulated return radar signal 310 to the radar system 100.

In some instances, the frequency synthesizer 332 is provided as a bus-controllable synthesizer capable of generating frequencies in at least the range of 10 KHz to 250 KHz with a relatively wide range of signal levels (e.g., −50 dBm to +10 dBm). The frequency synthesizer 332 may be provided, for example, as the type manufactured by Hewlett-Packard and identified as an HP890A multifunction synthesizer, however, other synthesizers having similar performance characteristics may be used. In response to the offset signal 336, the SSBG 334 shifts the frequency of the received outgoing radar signal 110 and suppresses one of its sidebands to provide a frequency-shifted, single-sideband signal coupled through signal path 344 to the amplitude adjustment element 338. Amplitude adjustment element 338 adjusts the amplitude of the signal 344 in accordance with an amplitude adjustment control signal 348 provided by the computer 200 to provide a processed signal 350 to the circulator 340. The circulator 340 thus provides a first relatively low insertion loss signal path to signals propagating from the antenna element 320b to the input port of the SSBG 334 and a second relatively low insertion loss signal path to signals propagating from the output port of the SSBG 334 to the antenna element 320b while providing a relatively high isolation characteristic between the first input port and the output port of the SSBG 334.

It should be appreciated certain electronic components can be shared by more than one antenna 320a, 320b. For example, the frequency synthesizer 332 can be shared by a plurality of transmit/receive processor modules 330a, 330b coupled to respective antenna 320a, 320b, when antennas sharing the same frequency synthesizer simulate portions of the same object.

Figure 7C:
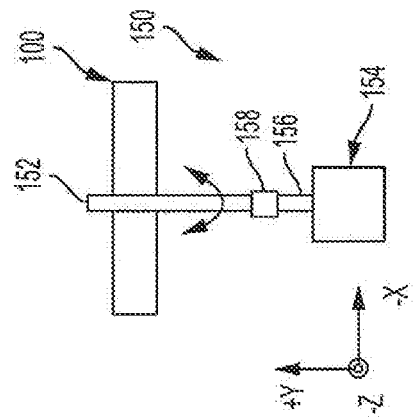
FIG. 7C schematically depicts a back view of a radar sensor and a radar sensor rotation system according to one or more aspects shown and described herein.
Figure 7B:
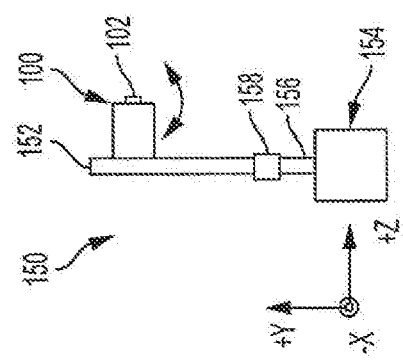
FIG. 7B schematically depicts a side view of a radar sensor and a radar sensor rotation system according to one or more aspects shown and described herein.
Figure 7A:
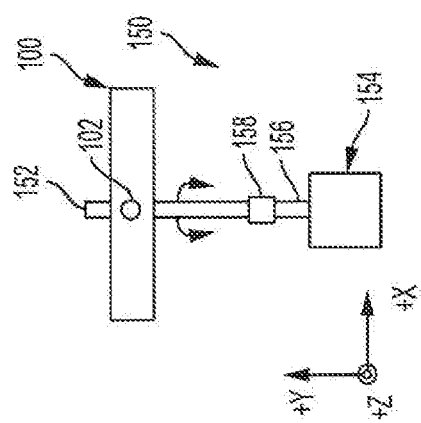
FIG. 7A schematically depicts a front view of a radar sensor and a radar sensor rotation system according to one or more aspects shown and described herein.

With reference now to FIGS. 7A-7C, the radar rotation system 150 includes a rotation shaft 152 that can be attached to the radar sensor 102. The rotation shaft 152 can be an axis of rotation and is mechanically coupled to a motor 154 having a motor rotation shaft 156, e.g., via a coupling 158. FIGS. 7A-7C depict an in-line coupling 158, however it should be appreciated that other couplings can be included such as gear couplings, chain couplings, belt couplings, and the like. The motor 154 is communicatively coupled with the computer 200 and can be instructed to rotate the motor rotation shaft 156 to a predetermined position that provides a predetermined angle between the central radar signal axis 112 and the central return radar signal axis 312. The motor 154 can be any type of motor that provides rotation of a shaft to a predefined location, for example a stepper motor that converts digital pulses transmitted by and received from the computer 200 into mechanical shaft rotation. A revolution of the motor 154 can be divided into a discrete number of steps, e.g. 180 steps, 360 steps, or any number of steps between 180 and 360 steps. The computer 200 can transmit and the motor 154 can received a digital pulse for each step. The motor 154 may take one step at a time with each step being the same size. Each digital pulse received by the motor 154 rotates the motor shaft 154 and thus the rotation shaft 152 a precise angle, e.g. 1°, 2°, etc. The position of the motor 154 can be controlled without any feedback mechanism. As the computer 200 transmits digital pulses at increasing frequencies, the step movement can change into a continuous rotation, with the speed of rotation directly proportional to the frequency of the digital pulses. In this manner, the angle between the central radar signal axis 112 and the central simulated return radar signal axis 312 can be controlled, set and moved as desired during testing of the radar system 100.

It should be appreciated that other methods or techniques to rotate the rotation shaft 152 are included within the scope of the instant disclosure. For example, manual movement (by hand) of the rotation shaft 152, and thus the radar sensor 102, to predetermined angular intervals for radar testing. The rotation shaft 152 can also be rotated by the extension and contraction of a hydraulic arm mechanically coupled to the radar system 100 such that movement of the hydraulic arm pivots the radar sensor 102 about the rotation axis of the rotation shall 150.

Figure 8:
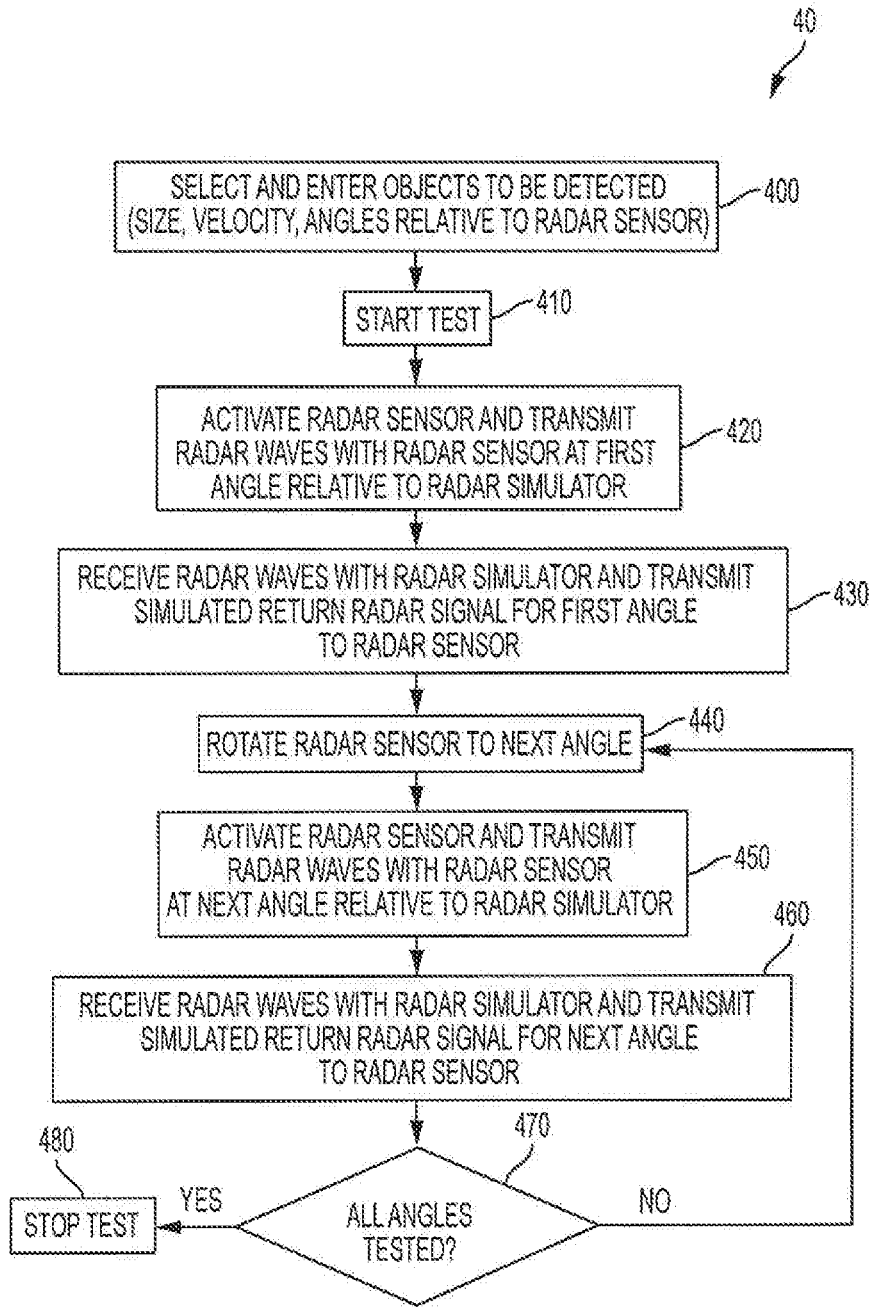
FIG. 8 schematically depicts a flowchart for a process for testing a radar system according to one or inure aspects shown and described herein.

With reference to FIG. 8, a method for testing a radar system is shown generally at reference numeral 40. The method 40 includes selecting and entering data on one or more virtual objects to be detected by the radar system 100 in the computer 200. A radar system test is started at step 410 and the radar sensor 102 is activated and transmits outgoing radar signals 110 with the radar sensor 102 at a first angle relative to the radar simulator 300 at step 420, i.e. a first angle between the central radar signal axis 112 and the central return signal axis 312. At step 430, the radar simulator 300 receives the outgoing radar signals 110 from the radar system 100 and transmits simulated return radar signals 310 for the first angle to the radar system 100. The radar sensor 102 is rotated to a next angle, that is different than the first angle, at step 440 and the radar sensor 102 is activated and transmits outgoing radar signals 110 with the radar sensor at the next angle relative to the radar simulator at step 450, i.e. a next angle between the central radar signal axis 112 and the central return signal axis 312. At step 460 the radar simulator 300 receives the outgoing radar signals 110 transmitted by the radar sensor 102 at the next angle and transmits simulated return radar signals 310 for the next angle to the radar system 100. At step 470, the computer 200 determines if a testing run is complete, e.g. determines if all angles for a given test have been executed. In the event that all angles have not been tested, the method returns back to step 440 where the radar sensor is rotated to the next angle which is different from the previous angle of tested in previous steps 440-460. The method proceeds again through steps 440-460 and continues this cycle until the radar system 100 has been be tested for all desired angles. In the event that all angles have been tested, e.g., angles of θ between 0-45°, the method proceeds to step 480 in which the test is stopped. It should be appreciated that the rotation of the radar sensor 102 to each angle can be step-wise or continuous. For example, the radar sensor 102 can transmit the outgoing radar signals 110 and the radar simulator 300 can receive the outgoing radar signals 110 and transmit the simulated return radar signals 310 while the radar sensor 102 is moved from angle-to-angle with the radar sensor 102 held at a given angle for fixed amount of time. The fixed amount of time can be for 0.1 seconds, 1 second, 3 seconds, 5 seconds, 10 seconds or time period between 0.1 seconds and 10 seconds. In the alternative, the radar sensor 102 can transmit the outgoing radar signals 110 and the radar simulator 300 can receive the outgoing radar signals 110 and transmit the simulated return radar signals 310 while the radar sensor 102 is moved continuously through a plurality of angles with the radar sensor 102 held at each angle for less than 0.05 seconds, less than 0.01 seconds or any time period less than 0.05 seconds.

It should now be understood that the radar testing systems with radar sensor rotation systems described herein may be utilized to test radar systems at different angles relative to radar simulators without manually moving the radar system and/or the radar simulator. The rotation of the radar system is provided by an automated system that rotates the radar system to predefined angles.

The systems and methods described and disclosed herein allow for radar system validation using virtual objects located and different angles relative to a central radar signal axis. The different angles for which the virtual objects are located and move through are provided by automated rotation of a radar sensor relative to a radar simulator.

While particular aspects, examples, etc., have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

We claim:

1. A radar testing system comprising:
a radar simulator with a radar simulator antenna configured to receive an outgoing radar signal from a radar system to be tested and transmit a simulated return radar signal representative of a virtual object in a field of view of the radar system to be tested back to the radar system during testing;
a computer communicatively coupled to the radar simulator, the computer having one or more processors and a non-transitory computer-readable medium storing computer-executable instructions, the computer configured to receive parameters for the virtual object in the field of view of the radar system and provide the parameters related to the virtual object to the radar simulator;
a radar sensor rotation system communicatively coupled to the computer and configured to rotate a radar sensor of the radar system to be tested about an axis of rotation to a plurality of predetermined angles during a test of the radar system; and
the radar sensor rotation system having a motor with a motor rotation shaft mechanically coupled to the radar sensor, wherein the computer-executable instructions executed by the one or more processors cause the motor to rotate the motor rotation shaft to the plurality of predetermined angles during the test of the radar system.

2. The radar testing system of claim 1, wherein the radar sensor rotation system rotates the radar sensor relative to a central simulated return radar signal axis of the radar simulator.

3. The radar testing system of claim 1, wherein the motor is a stepper motor.

4. The radar testing system of claim 3, wherein the computer-executable instructions executed by the one or more processors cause the motor to rotate the motor rotation shaft step-wise with the radar sensor at each of the plurality of predetermined angles for a fixed amount of time during the test of the radar system.

5. The radar testing system of claim 4, wherein the computer-executable instructions executed by the one or more processors cause the motor to rotate the motor rotation shaft continuously with the radar sensor at continuously moving through the plurality of predetermined angles during the test of the radar system.

6. A radar testing system comprising:
a radar system to be tested, the radar system having an amplifier, a mixer, a phase-locked loop, a voltage controlled oscillator and a radar sensor, the radar system configured to transmit a plurality of outgoing radar signals and receive a plurality of return radar signals;
a radar simulator having a radar simulator antenna and a simulation processor, the radar simulator configured to receive the plurality of outgoing radar signals from the radar system and transmit a plurality of simulated return radar signals to the radar system;
a computer communicatively coupled to the radar simulator, the computer having one or more processors and a non-transitory computer-readable medium storing computer-executable instructions, the computer configured to receive parameters for a virtual object in a field of view of the radar system and provide the parameters related to the virtual object to the radar simulator; and
a radar sensor rotation system communicatively coupled to the computer, the radar sensor rotation system having a rotation shaft mechanically coupled to the radar sensor and a motor mechanically coupled to the rotation shaft, the radar sensor rotation system configured to rotate the radar sensor about a rotation axis;
wherein the computer-executable instructions executed by the one or more processors cause:
the radar sensor rotation system to rotate and position the radar sensor at a plurality of predetermined angles relative to a central radar signal axis when the radar sensor is transmitting a plurality of outgoing radar signals; and
the radar simulator to receive the plurality of outgoing radar signals with the radar sensor positioned at the plurality of predetermined angles relative to a central simulated return radar signal axis and transmit a plurality of simulated return radar signals representative of the virtual object in the field of view of the radar sensor.

7. The radar testing system of claim 6, wherein the motor is a stepper motor.

8. The radar testing system of claim 7, wherein the computer-executable instructions executed by the one or more processors cause the motor to rotate the motor rotation shaft step-wise with the radar sensor at each of the plurality of predetermined angles for a fixed amount of time during a test of the radar system.

9. The radar testing system of claim 8, wherein the computer-executable instructions executed by the one or more processors cause the motor to rotate the motor rotation shaft continuously with the radar sensor at continuously moving through the plurality of predetermined angles during the test of the radar system.

10. A method of testing a radar system comprising:
providing the radar system to be tested, the radar system having a radar sensor;
providing a radar simulator, the radar simulator having a radar simulator antenna;
providing a radar sensor rotation system mechanically coupled to the radar sensor, the radar sensor rotation system having a motor with a motor rotation shaft mechanically coupled to the radar sensor;
providing a computer with one or more processors and a non-transitory computer-readable medium storing computer-executable instructions, the computer communicatively coupled with the radar simulator and the radar sensor rotation system;
testing the radar system wherein:
the radar system transmits a plurality of outgoing radar signals via the radar sensor and the radar simulator receives the plurality of outgoing radar signals and transmits a plurality simulated return radar signals back to the radar system;

the computer-executable instructions executed by the one or more processors cause the radar sensor rotation system to rotate the radar sensor to a plurality of angles relative to the radar simulator during testing of the radar system; and the computer-executable instructions executed by the one or more processors causing the motor to rotate the motor rotation shaft and the radar sensor to the plurality of angles relative to the radar simulator.

11. The method of claim 10, wherein the plurality of angles are relative to a central simulated return radar signal axis of the radar simulator.

12. The method of claim 10, further comprising the motor being a stepper motor.

13. The method of claim 12, further comprising rotating the motor rotation shaft step-wise with the radar sensor at each of the plurality of angles for a fixed amount of time during testing of the radar system.

14. The method of claim 12, further comprising rotating the motor rotation shaft continuously with the radar sensor continuously moving through the plurality of angles during testing of the radar system.

\* \* \* \* \*